US009543607B2

(12) United States Patent
Mokrini

(10) Patent No.: US 9,543,607 B2
(45) Date of Patent: Jan. 10, 2017

(54) PROCESS FOR PRODUCING ION EXCHANGE MEMBRANES BY MELT-PROCESSING OF ACIDIC PFSA IONOMERS

(71) Applicant: National Research Council of Canada, Ottawa (CA)

(72) Inventor: Asmae Mokrini, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 180 days.

(21) Appl. No.: 14/187,907

(22) Filed: Feb. 24, 2014

(65) Prior Publication Data
US 2014/0242368 A1    Aug. 28, 2014

Related U.S. Application Data

(60) Provisional application No. 61/767,849, filed on Feb. 22, 2013.

(51) Int. Cl.
| | |
|---|---|
| *H01M 8/10* | (2016.01) |
| *C08J 5/22* | (2006.01) |
| *C08K 5/544* | (2006.01) |

(52) U.S. Cl.
CPC ............. *H01M 8/1083* (2013.01); *C08J 5/22* (2013.01); *C08J 5/2237* (2013.01); *C08K 5/5442* (2013.01);
(Continued)

(58) Field of Classification Search
CPC   H01M 8/1083; H01M 8/1086; H01M 8/1067; H01M 8/1039; H01M 8/1023; C08J 5/22
(Continued)

(56) References Cited

U.S. PATENT DOCUMENTS

| 4,652,608 A | 3/1987 | Parker |
| 6,042,958 A | 3/2000 | Denton et al. |

(Continued)

FOREIGN PATENT DOCUMENTS

| DE | 102006062251 A1 * | 6/2008 | .......... H01M 8/0239 |
| JP | 2002231269 A2 | 8/2002 | |

(Continued)

OTHER PUBLICATIONS

Bebin et al., Proton Exchange Membrane Development and Processing for Fuel Cell Application, Materials Science Forum vols. 539-543 (2007) pp. 1327-1331.

(Continued)

*Primary Examiner* — Michael M Bernshteyn
(74) *Attorney, Agent, or Firm* — Catherine Lemay

(57) ABSTRACT

A process for producing an ion exchange membrane involves melt-processing a mixture of a perfluorosulfonic acid ionomer in its acid form and a specific azole additive. The additive may be a triazole, alkyl triazole, vinyl triazole, fluoro-alkyl triazole, fluoro-vinyl triazole, pyrazole, alkyl pyrazole, vinyl pyrazole, fluoro-alkyl pyrazole, fluoro-vinyl pyrazole, benzimidazole, alkyl benzimidazole, vinyl benzimidazole, fluoro-alkyl benzimidazole, fluoro-vinyl benzimidazole or any mixture thereof to form a film having a thickness of from 3 to 200 microns. Ion exchange membranes so produced have reduced in-plane-swelling, improved dimensional stability and mechanical properties, and are useful as electrolytes in proton exchange membrane fuel cells.

18 Claims, 6 Drawing Sheets

NR-40 / 15wt.% 1,2,4-triazole    NR-40 / 15wt.% Imidazole

(52) U.S. Cl.
CPC ......... *H01M 8/1023* (2013.01); *H01M 8/1039* (2013.01); *H01M 8/1067* (2013.01); *H01M 8/1069* (2013.01); *H01M 8/1086* (2013.01); *H01M 2008/1095* (2013.01); *Y02E 60/521* (2013.01); *Y02P 70/56* (2015.11)

(58) Field of Classification Search
USPC .......................................... 521/27; 428/220
See application file for complete search history.

(56) References Cited

U.S. PATENT DOCUMENTS

| | | | |
|---|---|---|---|
| 6,248,469 | B1 | 6/2001 | Formato et al. |
| 7,956,095 | B2 | 6/2011 | Sanchez et al. |
| 8,142,917 | B2 | 3/2012 | Uensal et al. |
| 2004/0009385 | A1 | 1/2004 | Barnwell et al. |
| 2004/0126666 | A1 | 7/2004 | Cao et al. |
| 2005/0017397 | A1 | 1/2005 | Silagy et al. |
| 2005/0238937 | A1 | 10/2005 | Oren et al. |
| 2006/0057449 | A1 | 3/2006 | Calundann et al. |
| 2006/0078774 | A1 | 4/2006 | Uensal et al. |
| 2006/0183011 | A1* | 8/2006 | Mittelsteadt ........... B01D 69/10 429/304 |
| 2006/0199062 | A1 | 9/2006 | Yanagita et al. |
| 2009/0131544 | A1 | 5/2009 | Sanchez et al. |
| 2009/0203805 | A1 | 8/2009 | Sanchez et al. |
| 2010/0167163 | A1 | 7/2010 | Calundann et al. |
| 2010/0330456 | A1 | 12/2010 | Yanagita et al. |

FOREIGN PATENT DOCUMENTS

| | | |
|---|---|---|
| JP | 2004071361 A2 | 4/2004 |
| WO | WO2006097603 | 9/2006 |
| WO | WO2012028736 | 3/2012 |

OTHER PUBLICATIONS

Bebin et al, Processing of sulfonated polysulfone for PEMFC membrane applications: Part 2. Polymer in salt form, Advances in Polymer Technology, vol. 25, Issue 2, pp. 127-133, 2006.

Lee et al., Effects of block length and solution-casting conditions on the final morphology and properties of disulfonated poly(arylene ether sulfone) multiblock copolymer films for proton exchange membranes, Polymer, vol. 50, Issue 25, pp. 6129-6138, 2009.

Lai Yeh-Hung et al., Viscoelastic stress analysis of constrained proton exchange membranes under humidity cycling, (2009) Journal of Fuel Cell Science and Technology, vol. 6 (2), pp. 1-13.

Sen U, et al. (2008) Anhydrous proton conducting membranes for PEM fuel cells based on Nafion/Azole composites. International Journal of Hydrogen Energy. 33, 2808-2815.

Sanchez et al., Extrusion: An environmentally friendly process for PEMFC membrane elaboration, Electrochimica Acta 53 (2007) 1584-1595.

Notice of Reason dated Aug. 16, 2016 for Japanese Application No. 2014-546250.

* cited by examiner

*NR-40 / 15wt.% 1,2,4-triazole*   *NR-40 / 15wt.% imidazole*

PROCESS FOR PRODUCING ION EXCHANGE MEMBRANES BY MELT-PROCESSING OF ACIDIC PFSA IONOMERS

FIELD OF THE INVENTION

The present invention relates to ion exchange membranes and to processes for producing ion exchange membranes, in particular membranes based on perfluorosulfonic acid (PFSA) ionomers.

BACKGROUND OF THE INVENTION

Ion exchange membranes are used as solid electrolytes in electrochemical energy conversion devices such as fuel cells, electrolysers, in separation processes, sensors, etc. Perfluorinated ion exchange membranes are state of the art proton exchange membranes (PEM) used as electrolytes for fuel cells. Polymer Electrolyte Membrane Fuel Cell (PEMFC) technologies are efficient energy conversion devices where the PEM used as the electrolyte play a central role serving as both electrolyte and gas separator. In order to produce electricity efficiently, the polymer electrolyte membrane of a PEMFC must be robust, highly proton conductive, and gas impermeable. Such membranes are generally prepared by solution or dispersion casting of the acid form of the ionomer or by melt-extrusion of a precursor polymer containing sulfonyl halide protective groups that has to be hydrolyzed and acid-exchanged after melt-processing.

There is still a continuing need to reduce cost and the level of manufacturing processes complexity while improving durability and reliability of PEM. To date, solution-cast perfluorosulfonic acid (PFSA) ionomer membranes (e.g. Nafion™) and solution-cast PFSA membranes reinforced with polytetrafluoroethylene (PTFE) support (e.g. Gore®) have been the most widely used membranes for PEMFCs. However, these materials are costly and still need to meet the requirements for high volume commercial markets. The mechanical and chemical durability of proton exchange membranes is also essential for building robust and long-lasting PEM fuel cells for automotive and stationary applications.

Melt processes represent the best technologies for mass production of homogeneous thin polymer films at low cost. Besides eluding the serious safety and environmental concerns related to the mass production of membranes by solution-casting, melt processes provide a mechanical reinforcement through chain orientations following extrusion-stretching. This structural reinforcement at a molecular level provides extruded PEM with the mechanical durability required for building robust and long-lasting PEM fuel cells. Extruded membranes have already proven to have a much higher mechanical and chemical durability in a fuel cell than solution-cast membranes (Lai 2009). In situ humidity cycling experiments, designed to assess the mechanical durability in PEM, have demonstrated that the stresses induced in the membrane upon cycling between wet and dry conditions can lead to crack formation, which leads to gas crossover and ultimately failure of the fuel cell.

Extruded PEMs are generally processed from non-ionomeric (non-conducting) polymers that have to go through a post-functionalization reaction (e.g. post-sulfonation) to introduce ionic functionalities or from precursors where the ionic groups are protected (e.g. PFSAs in the sulfonyl fluoride form). These non-functional analogs are then chemically converted into their functional counterparts (e.g. their acid form). In both cases, several chemical treatments have to be conducted during the manufacturing process prior to catalytic layers integration, which adds complexity to an otherwise simple process. It is highly desirable to directly extrude the functional polymers in their active form. Unfortunately, the strong ionic associations in ionomers act generally as physical cross-links, increasing by several orders of magnitude both melt-viscosities and relaxation times, resulting in ionomeric materials that are very difficult to melt-process. The strength of the ionic interactions in ionomers, and hence their physical and mechanical properties, depends on the acidity of the pendent anion. Polymers modified with the stronger acid, such as sulfonic acid (pKa about 1), exhibit more dramatic changes in thermal, viscoelastic, and rheological properties than those modified with the weaker carboxylic acid (pKa about 4-5). However, most ionomers may be melt-processed in very low shear rate operations such as compression-molding, which reveals that these ionic associations are not permanent cross-links and can be reversibly disrupted under suitable conditions.

It is known in the art (Sanchez 2009 for example) that plasticizers like imidazole, N-alkylimidazole and N-vinylimidazole can be used as processing aids for melt processing of polysulfone polymers. However, these processing aids are particular to polysulfone-like polymers and are not transferable to the melt-processing of PFSA ionomers.

It is further known (Sen 2008) that 1H-1,2,4-triazole can be used to improve anhydrous proton conduction of Nafion™ membranes, but the triazole is introduced into these membranes by solution impregnation techniques, not melt-processing techniques. There is no suggestion that the triazole can be used as a plasticizer in a melt-processing process. The resulting poor dispersion of the triazole in the film detracts from the mechanical properties of the membrane.

There remains a need for PFSA-based ion exchange membranes with improved properties.

SUMMARY OF THE INVENTION

The present invention provides a melt-processing process for prototyping ion exchange membranes directly from thermoplastic perfluorosulfonic acid ionomers in their ionic form through incorporation of additives specially selected with the capability to modify the rheological behavior of perfluorosulfonic acid enabling successful melt-processing, and to protect the ionic group from degradation during melt-processing.

In one aspect of the invention, there is provided a process for producing an ion exchange membrane comprising: melt-processing a mixture of a perfluorosulfonic acid ionomer in its acid form and an additive comprising triazole, alkyl triazole, vinyl triazole, fluoro-alkyl triazole, fluoro-vinyl triazole, pyrazole, alkyl pyrazole, vinyl pyrazole, fluoro-alkyl pyrazole, fluoro-vinyl pyrazole, substituted tetrazole (especially 5-aminoetetrazole), benzimidazole, alkyl benzimidazole, vinyl benzimidazole, fluoro-alkyl benzimidazole, fluoro-vinyl benzimidazole or any mixture thereof that are water soluble, non-volatile, and thermally stable at processing temperatures, with a boiling point higher than the melt processing temperature (for example at least 10° C. higher) to form a film having a thickness of from 3 to 200 microns.

In another aspect of the invention, there is provided an ion exchange membrane comprising a film of a perfluorosulfonic acid ionomer in its acid form, the film having a length, width and thickness, the thickness being from 3 to 200 microns, and the film having a dimensional stability such that the length and/or width changes by less than 10% when the membrane is exposed to water.

Perfluorosulfonic acid (PFSA) ionomers are polymers having a chemical moiety of the Formula (I):

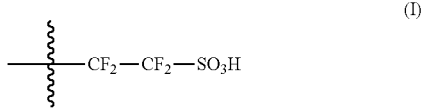

(I)

A preferred class of perfluorosulfonic acid ionomers are PFSA-polytetrafluoroethylene copolymers of Formula (II),

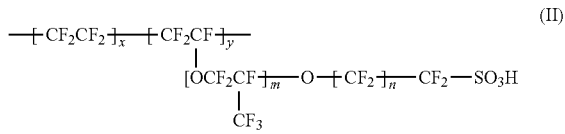

(II)

where x, y, m and n represent the numbers of repeat units. x and y are the numbers for tetrafluoroethylene and perfluorosulfonic acid repeat units respectively and m and n are the repeat units in the side chains of perfluorosulfonic acid blocks. x and y are equivalent weight dependent. For example for Nafion™ ionomer, a PFSA known in the art, the relationship between equivalent weight (EW) and m is $EW=100x+446$ so that the side chains are separated by around 14 $CF_2$ units in an ionomer with $EW=1100$. Preferably, the number of repeat units x and y are such that there are less than 15× units for each y and the value of m and n are integers between 0 and 5. Examples of PFSA copolymers known in the art are Nafion™: m=1 and n=1, Flemion™: m=0 or 1 and n=1 to 5, Aciplex™: m=0 or 3 and n=2 to 5, 3M™ ionomer: m=0 and n=2, Aquivion™: m=0 and n=1. Triazole, alkyl triazole, vinyl triazole, fluoro-alkyl triazole, fluoro-vinyl triazole, pyrazole, alkyl pyrazole, vinyl pyrazole, fluoro-alkyl pyrazole, fluoro-vinyl pyrazole, benzimidazole, alkyl benzimidazole, vinyl benzimidazole, fluoro-alkyl benzimidazole and fluoro-vinyl benzimidazole are processing additives that are water soluble, non-volatile, and thermally stable at processing temperatures, with a boiling point higher than the melt processing temperature. In the process, these compounds are thought to form a shielding moiety by forming a conjugated acid with acidic groups of the ionomer, and as a plasticizer by reducing the glass transition temperature and the viscosity of the ionomer. The additives are organic compounds capable of accepting and donating protons (amphoteric) and have the ability to form conjugated acids with the acid groups of the ionomer. 1,2,4-triazole, benzimidazole or mixture thereof are preferred.

To prepare ionomer-additive blends, wet processing is preferred whereby the additive is first dissolved in solution, preferably aqueous solution, before blending with the PFSA ionomer. Wet processing may involve pre-swelling of the ionomer before blending with the additive.

The additives identified are proton carriers and improve the conductivity and performance of the membrane in anhydrous or low relative humidity (RH) conditions. In such cases, the additive may remain in the membrane to promote high temperature proton conduction. In a more humid environment, the additive may instead be removed from the membrane after melt processing. Removal of the additive may be accomplished with a solvent in which the additive is soluble and in which the ionomer is not soluble. Preferably the solvent is water or an aqueous solution. Aqueous solutions are preferably acidic solutions, more preferably solutions of sulfuric acid.

Melt processing techniques are generally known in the art and include, for example, melt-extrusion, melt-casting and melt-blowing. Melt-extrusion techniques are generally known in the art to prepare mixtures of materials, and can produce membranes. Membranes produced by the process of the present invention have a thickness of from 3 to 200 microns. Advantageously, membrane thicknesses of less than 100 microns are possible, for example thicknesses less than 95 microns, or less than 75 microns. Thicknesses of from 10 to 75 microns are of particular note, for example 50 microns.

Membranes produced by the process of the present invention have excellent dimensional stability and reduced in-plane swelling. Membranes typically have a length, width and thickness. The swelling in the thickness direction is typically controlled by bipolar plates and current collector hardware adjacent the membrane-electrode assembly. The present membranes are advantageously stable along their length and/or width when exposed to water. Thus, the length and/or width changes by less than 10%, preferably less than 7.5%, more preferably less than 6%, when the membrane is exposed to water.

Membranes produced in accordance with the present invention are particularly useful as electrolytes in electrochemical devices, for example, fuels cells and electrolyzers. They are particularly useful as electrolytes in polymer electrolyte membrane fuel cells (PEMFC), and have higher ionic conductivity and dimensional stability, and improved mechanical and chemical durability than those known in the art. Membranes of the present invention may combine extreme thinness with very low in-plane swelling, which is particularly advantageous for ion exchange membranes.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
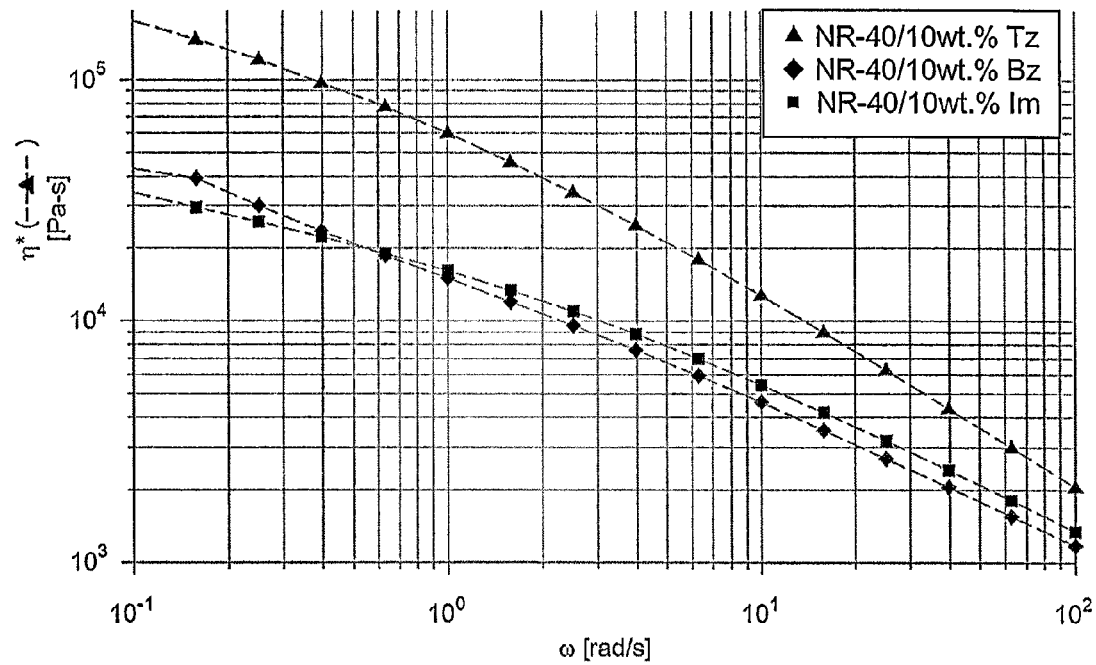
FIG. 1 provides rheological data measured on acid PFSA (Nafion™ NR-40) with 10 wt % of three different azole additives (Tz: 1,2,4-Triazole, Bz: Benzimidazole and Im: Imidazole) using a rotational rheometer (Advanced Rheometric Expansion System (ARES)) in dynamic mode. Frequency sweep at 260° C. under dry nitrogen atmosphere.

Methods and Materials:

Materials: For the examples described herein, two PFSA ionomers in the acid form were used: a long side chain PFSA; Nafion™ NR-40 with an Equivalent Weight EW=1000 g/eq, a short side chain PFSA Aquivion™ with EW=830 g/eq.

Rheology: To determine melt viscosities of polymer/additive blends, dynamic rheological measurements were performed in an ARES (Advance Rheometric Expansion System) rotational rheometer under dry nitrogen atmosphere at T=260° C. Prior to testing, samples were dried 24 h under active vacuum at 60° C. The test consists on a frequency sweep over a range spanning from 100 down to 0.1 rad/s. Small deformations (10% or 15%) oscillatory motions were imposed on the samples for all time and frequency sweeps to avoid any irreversible damage of the structure of the material. The measurements allow to evaluate the response of the materials tested in term of elastic or storage modulus (G'), viscous or loss modulus (G"), and the dynamic complex viscosity ($\eta^*$).

Melt-processing: PFSA Nafion™ NR-40/additive blends were directly extruded by melt-casting or melt-blowing at a bench-top microextruder (DSM), and scaled-up to pilot-scale extruders (LabTech). Processing temperature was 260° C.

Activation: Membranes obtained with the process described herein, could be used directly, or could be activated to remove the additive for low temperature operation. The activation consists of soaking the membranes in de-ionized (DI) water or a $H_2SO_4$ solution in water (1:5 vol %) for 1 hour at 80° C.

Proton conductivity: In-plane proton conductivities were measured using a Solartron 1260. A strip of membrane (in $H^+$ form) was set between 2 Pt electrodes and an alternating current was passed through the plane of the sample. In the case of room temperature and liquid water conditions, the samples were immersed in Millipore water. Nyquist plots between 5 MHz to 10 Hz were collected and membrane resistance was extrapolated by fitting the semi-circle part of the data to equivalent circuits. Proton conductivities were calculated from the equation below:

$$\sigma = \frac{d}{RS}$$

where $\sigma$ is proton conductivity, d is the distance between the Pt electrodes, R is membrane resistance and S is the cross-sectional area of the sample.

Water Uptake (WU) and Volume Change (VC): After measuring mass of wet and dried membranes (in $H^+$ form), WU was calculated from the equation below:

$$WU = \frac{\text{Wet mass} - \text{dry mass}}{\text{dry mass}} \times 100\%$$

The mass of dried membranes were obtained after drying them in a vacuum oven at 80° C. overnight. For VC measurements, thickness, width and length of wet and dried membranes were determined. Wet/dry volume change was calculated from the equation below:

$$VC = \frac{\text{Volume of wet membranes} - \text{volume of dried membranes}}{\text{Volume of dried membranes}} \times 100\%$$

Dry measurements were obtained after drying the membranes in a vacuum oven at 80° C. overnight. Wet/dry dimensional changes were measured for the membranes and compared to reference solution cast (Nafion™ NRE-211) and melt extruded (Nafion™ N-111-IP) commercial membranes.

Transmission Electron Microscopy (TEM): Membranes in the acid form were previously immersed in a saturated lead acetate solution during 2 h at room temperature to stain the ionic domains. The samples were then microtomed into thin samples of 50 nm thickness using a diamond knife. TEM of ultrathin sections of the samples were obtained with a Philips CM 200 instrument with an acceleration voltage of 200 kV.

Mechanical micro-tensile tests: The tensile mechanical properties of films were measured according to standard ASTM D1708 in an Instron 5548 microtester. The test specimens were drawn at a speed of 5 mm/min. Each reported value is the average of five measurements.

Fenton test: Fluoride ion release using the Fenton's test was conducted using 10 wt % hydrogen peroxide and $FeSO_4 \cdot 7H_2O$ solution (~800 ppm $Fe^{2+}$). Around 100-150 mg of dried membrane was weighed and placed in a vial. 20 mL of the $H_2O_2$ 10 wt % solution and 1.0 mL $Fe^{2+}$ solution were added to each bottle. Then the membrane was exposed to the Fenton's reagent for 6 hours at 80° C. After treatment, the membrane was repeatedly rinsed with de-ionized water. 2.5 mL of the Total Ionic Strength Adjustor Buffer (TISAB) were added into each bottle to adjust the PH of the solution, decomplex fluoride and provide a constant background ionic strength, the resulting solution including rinses was weighted. A Fluoride Combination Electrode was used to analyze the concentration of fluoride ions. Both the concentration of fluoride ions and the volume of recovered solutions were used to determine the total number of moles of fluoride released.

Example 1

Preparation of PFSA/Additive Blends and their Rheological Characterization

Two additives useful in the present invention (1,2,4-triazole (Tz) and benzimidazole (Bz)) and one comparative additive from the prior art (imidazole (Im)) were selected. Nafion™/additive (10 wt %) blends were prepared by dissolving the additive in water followed by addition of the solution to Nafion™ NR40 and stirring to allow a homogeneous swelling of the ionomer. The blends were then dried at 60° C. overnight under vacuum to remove the water. The dried solid mixture was then analyzed in a rheometer. FIG. 1 shows the results of the frequency sweep test at 260° C., where the dynamic complex viscosity (Eta* or $\eta^*$) is represented as a function of the oscillation frequency. While the Nafion™ NR40 sample was impossible to analyze due to its very high viscosity and visible thermal degradation of the acidic groups, the Nafion™/additive samples show a flow behavior as the additive forms a conjugated acid with the ionic groups of the ionomer, shielding the strong sulfonic acid interactions. The melt viscosity increases as the shear rate is decreased, showing the non-Newtonian properties of these blends as the linear dependence of complex viscosity at low frequency was not observed. Nafion™NR40/1,2,4-triazole blend show higher viscosity than imidazole and benzimidazole based blends.

Example 2

Effect of the Concentration of Additive on the Melt-Viscosity

Figure 2:
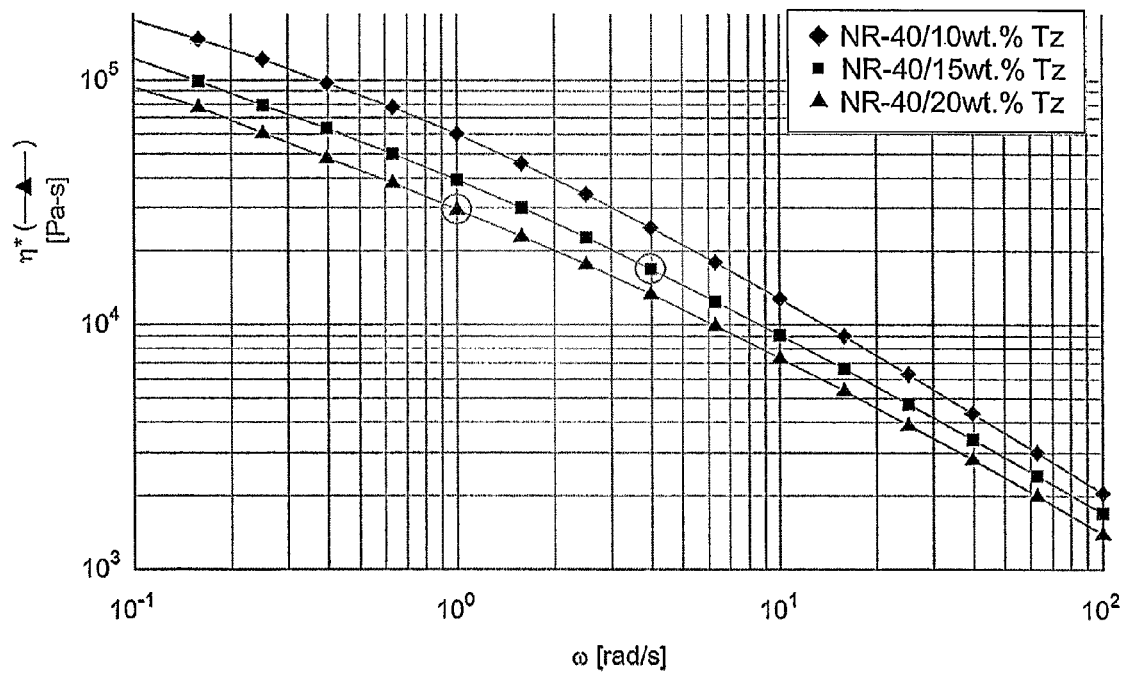
FIG. 2 provides rheological data measured on PFSA precursor (Nafion™ R-1000 from Ion-Power) using a rotational rheometer (Advanced Rheometric Expansion System (ARES)) in dynamic mode. Frequency sweep at 260° C. under dry nitrogen atmosphere.

Nafion™NR40/1,2,4-triazole blends were prepared as described in Example 1, with additive loadings of 10, 15 and 20 wt % corresponding to 1.6, 2.6 and 3.6 mol of 1,2,4-triazole per mol of $SO^{3-}$ respectively. FIG. 2 shows the results of the frequency sweep test at 240° C., where the dynamic complex viscosity is represented as a function of the oscillation frequency. Nafion™NR40/1,2,4-triazole blends show a decrease in the viscosity as the concentration of additive increases.

Example 3

Melt-Processability of the Acid Ionomer/Additive Blends Prepared in Examples 1 And 2 to Produce Practical Thin Membranes A blend based on Aquivion® short side chain PFSA ionomer (EW=830 g/eq) and 15 wt % 1,2,4-triazole was also prepared as described in Example 1. Melt-processing was carried out at 260° C., using a 5 cc bench-top micro-extruder (DSM-Explore) equipped with a film line. The die used for thin film preparation has an opening gap of 0.1 mm and a width of 3.5 cm. The screws RPM, the calender rolls speed and torque was varied to achieve the required thickness. The strips of membranes obtained had a final width of approximately 2.5 cm and a thickness in the range of 5 to 50 microns.

Figure 3:
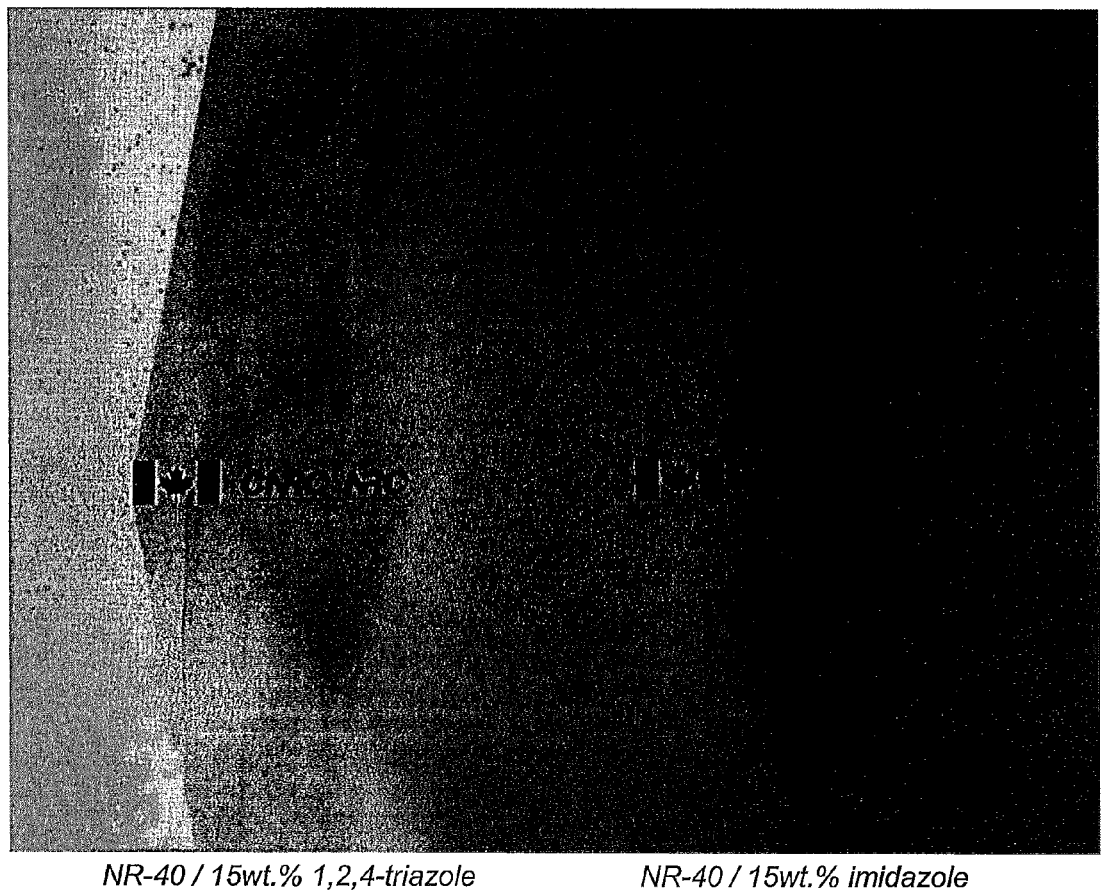
FIG. 3 provides a picture of extruded membranes based on Nafion® NR40 and 15 wt % of 1,2,4-triazole (left) and imidazole (right) additives.

Melt-processing to produce PFSA-based thin and transparent membranes was successful with triazole and benzimidazole additives. However, it is particularly noteworthy that melt-processing using imidazole as the additive completely failed to produce PFSA-based membranes, despite the fact that it was successfully used in the prior art to form polysulfone-based membranes (US 2009-1315444). Imidazole based membranes show clear signs of degradation (yellow-brown coloration) and the presence of holes as illustrated in FIG. 3, since the processing temperature of PFSA ionomer (260° C.) is close to imidazole boiling point (256° C.).

Example 4

Process Scale-Up

To demonstrate the feasibility of the procedure developed herein at an industrial level, the manufacturing process was scaled-up from bench-top to pilot-scale level. The process described in U.S. provisional patent application U.S. Ser. No. 61/577,138 based on a multilayer melt-blowing process was used successfully for the prototyping of 15 to 20 cm wide rolls of polymer electrolyte membranes with a thickness ranging from more than 200 microns down to 3 microns directly from Nafion™NR40/15 wt %1,2,4-triazole blend.

Example 5

Activation Protocols and Membrane Characterization

The membranes obtained in Example 4 with the pilot-scale process were used.

Two activation protocols were used:

Protocol A1 comprises soaking the membranes in DI water for 1 h at 80° C.;

Protocol A2 comprises soaking the membranes for 1 h at 80° C. in a solution $H_2SO_4:H_2O$ (1:5 vol %), followed by DI water for 1 h at 80° C.

Properties of acid extruded membranes activated with protocols A1 and A2 were measured and compared with NRE-211 a solution-cast Nafion™ membrane, and N111-IP an extruded commercial Nafion™ membrane. For comparison purposes, the thickness of the membranes selected was about 25±5 microns.

Figure 4A:
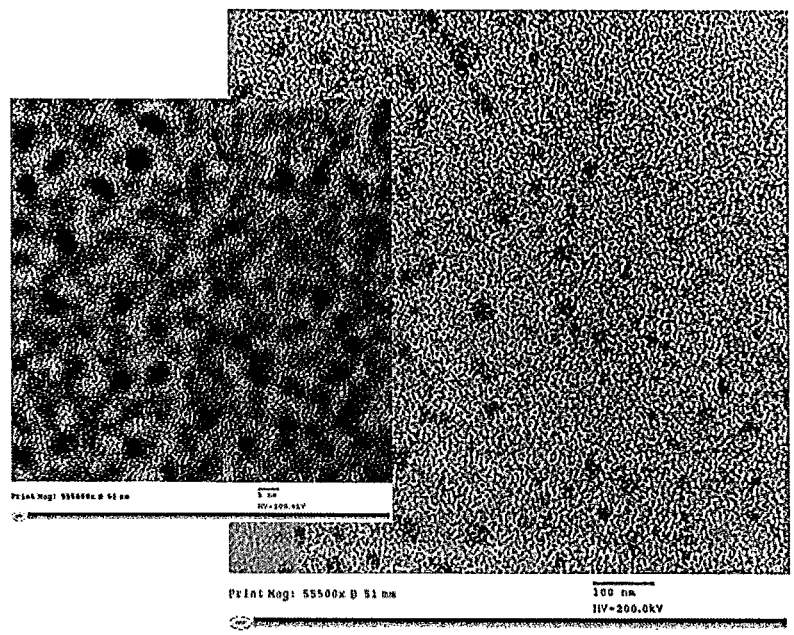
FIG. 4 provides Transmission Electron Microscopy (TEM) images with two magnifications (×55.5 k and × 555 k) on lead acetate stained membranes as extruded (FIG. 4A) and after activation using protocol A1 (FIG. 4B)
Figure 4B:
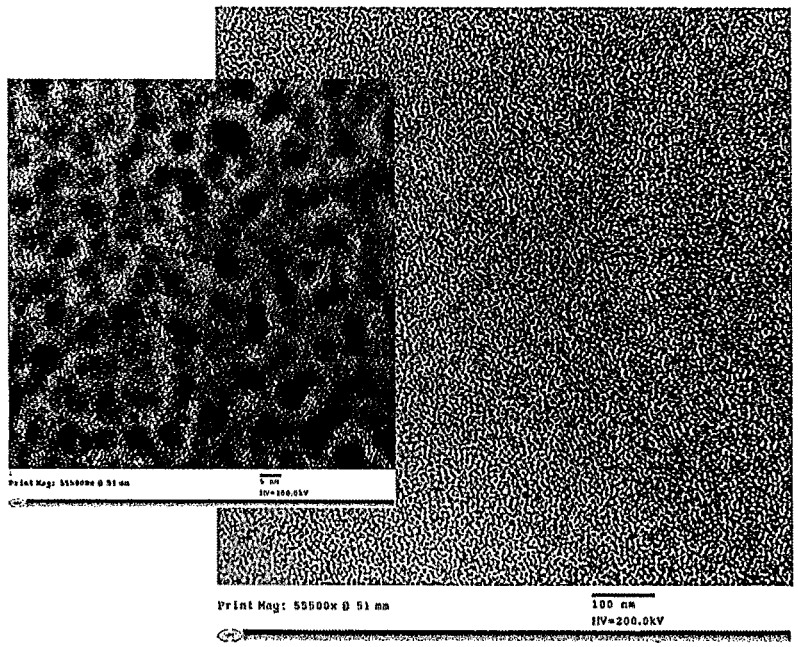

Transmission Electron Microscopy (TEM) technique was used to examine the morphology and the arrangement of the hydrophobic/hydrophilic phase separation within the ionomeric materials produced. High resolution TEM images on lead acetate stained membranes prepared by melt-blowing with 15 wt % 1,2,4-triazole as additive are presented in FIG. 4. FIG. 4A corresponds to the membrane as extruded and FIG. 4B to the membrane after activation using protocol A1. Two magnifications are shown for each membrane. The fine phase separation of hydrophilic and hydrophobic domains characteristic of PFSA ionomers is visible in all cases. The dark regions correspond to the ionic domains and the clear domains to the hydrophobic backbone of PFSA. The low magnification micrograph corresponding to the as extruded sample (FIG. 4A), shows dark spots related to the excess additive still present.

After activation according to the protocols A1 and A2, ion exchange capacity (IEC) was determined by titration, and proton conductivity was measured by impedance spectroscopy at room temperature in water, and at 80° C. at 50% and 30% relative humidity (RH). The results, presented in Table 1, show a higher IEC and conductivity for the membranes activated according to protocol A2. Those activated according to protocol A1 show values in the same range as commercial references. These results suggest that a simple activation in water at 80° C. allows a complete dissociation of the additive in water and a recovery of the full ion exchange capacity of the membranes.

TABLE 1

IEC and Conductivity

| Sample | IEC (mmol/g) | Conductivity (S/cm) | | |
|---|---|---|---|---|
| | | RT @ in water | 80° C. @ 50% RH | 80° C. @ 30% RH |
| NRE-211 | 0.835 | 6.87E−02 | 2.81E−02 | 3.61E−03 |
| N111-IP | 0.872 | 6.65E−02 | 2.30E−02 | 6.02E−03 |
| MB-NR40/15% Tz A1 | 0.887 | 6.91E−02 | 1.57E−02 | 3.02E−03 |
| MB-NR40/15% Tz A2 | 0.939 | 1.02E−01 | 5.59E−02 | 1.43E−02 |

Figure 5:
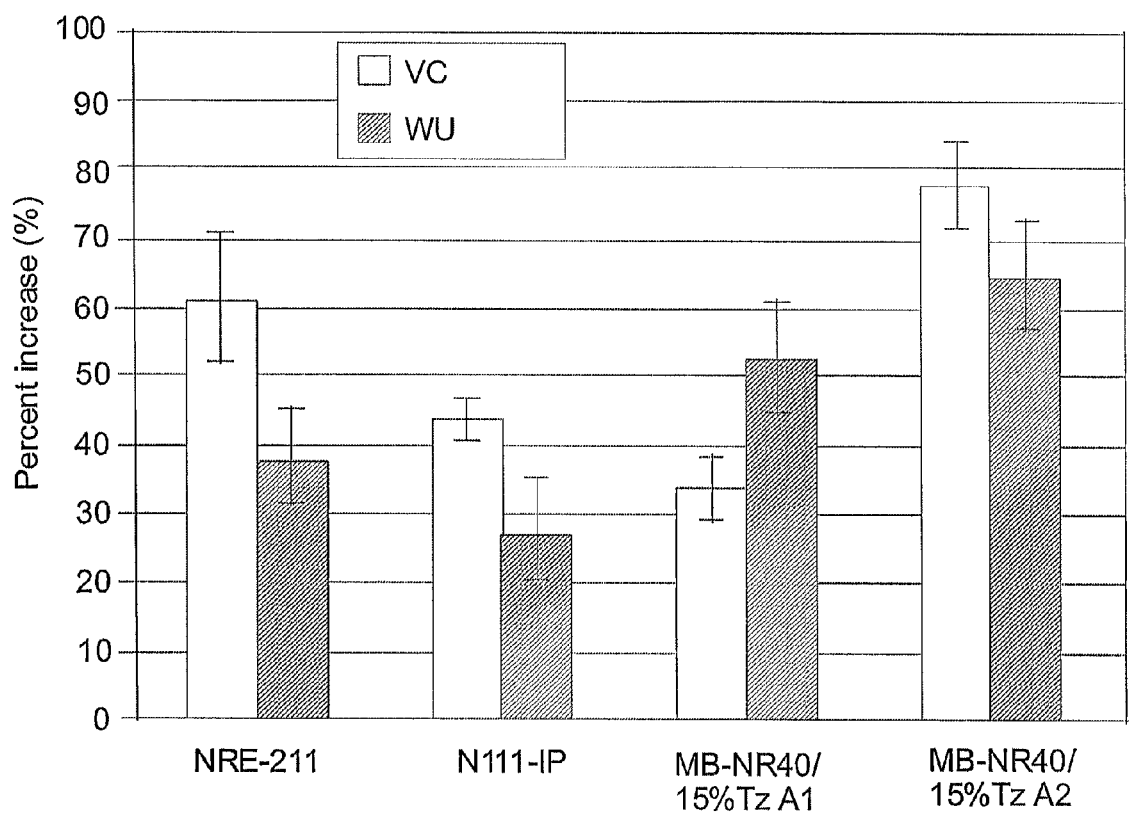
FIG. 5 is a graph depicting dry/wet volume change (VC) and water uptake (WU) measured for acid extruded Nafion™ NR40 with 15 wt % of 1,2,4-triazole additive activated with protocols A1 (MB-NR40/15% Tz A1) and A2 (MB-NR40/15% Tz A2) as well as NRE-211 and N111-IP references.

FIG. 5 shows water uptake (WU) and dry/wet volume change (VC) measured for acid extruded membranes, NRE-211 and N111-IP references. Membranes activated according to protocol A1 show reduced volume change but higher water uptake compared to NRE-211 and N111-IP references, while membranes activated with protocol A2 show higher WU and VC due to its higher IEC.

Figure 6:
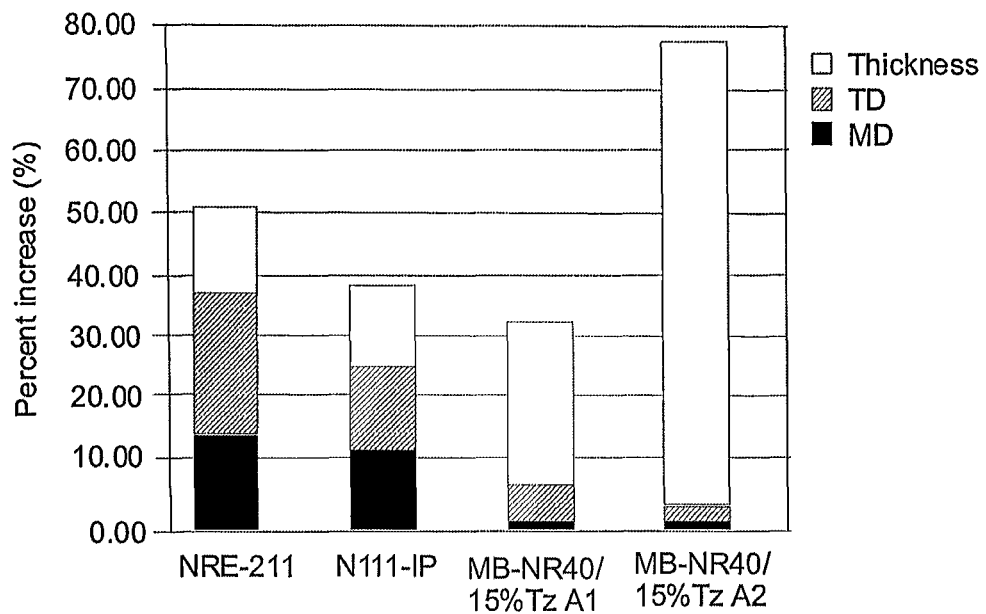
FIG. 6 is a graph depicting dry/wet changes in thickness and linear expansion in the machine direction (MD) and transverse direction (TD) measured for acid extruded Nafion™ NR40 with 15 wt % of 1,2,4-triazole additive activated with protocols A1 (MB-NR40/15% Tz A1) and A2 (MB-NR40/15% Tz A2) as well as NRE-211 and N111-IP references.

The membranes prepared according to the process described in this patent show a very low linear expansion independently of the activation protocol used. They swell preferentially in the thickness direction as shown in FIG. 6 and Table 2. This is an extremely interesting property in PEMFC. This dimensional stability behavior has not been observed before to our knowledge and is desirable for minimizing stresses that develops in an operating fuel cell during humidity cycling, thus leading to enhanced mechanical durability.

TABLE 2

Dry/Wet Dimensional Changes

| Sample | Dimensional changes (%) | | | | |
|---|---|---|---|---|---|
| | TD | MD | Thickness | Area | Volume |
| NRE-211 | 15.56 | 22.74 | 13.33 | 41.92 | 60.84 |
| N111-IP | 12.08 | 13.46 | 13.09 | 27.18 | 43.81 |
| MB-NR40/15% Tz A1 | 1.19 | 5.72 | 25.36 | 7.01 | 34.10 |
| MB-NR40/15% Tz A2 | 1.54 | 2.33 | 71.30 | 3.88 | 77.92 |

Figure 7:
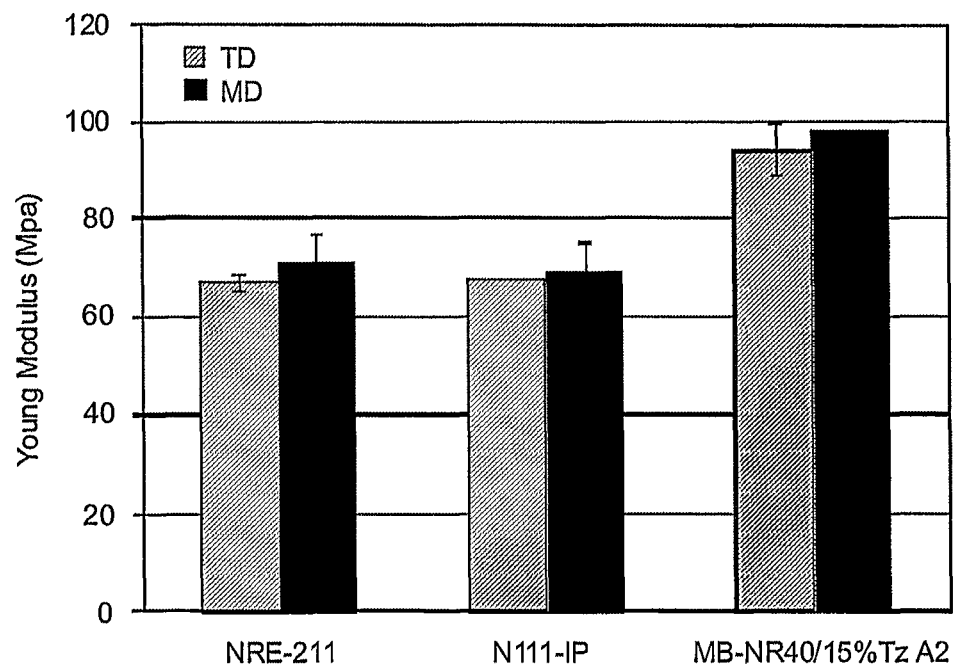
FIG. 7 provides Young modulus in machine direction (MD) and transverse direction (TD) determined from stress-strain curves for MB-NR40/15% Tz A2 membrane and NRE-211 and N111-IP references.

The micro-tensile properties of membranes activated with protocol A2 were measured and compared to commercial references. FIG. 7 provides Young modulus in machine direction (MD) and transverse direction (TD) determined from stress-strain curves. The results show a higher elastic modulus for MB-NR40/15% Tz A2; 94 MPa and 98 MPa in TD and MD, respectively.

Figure 8:
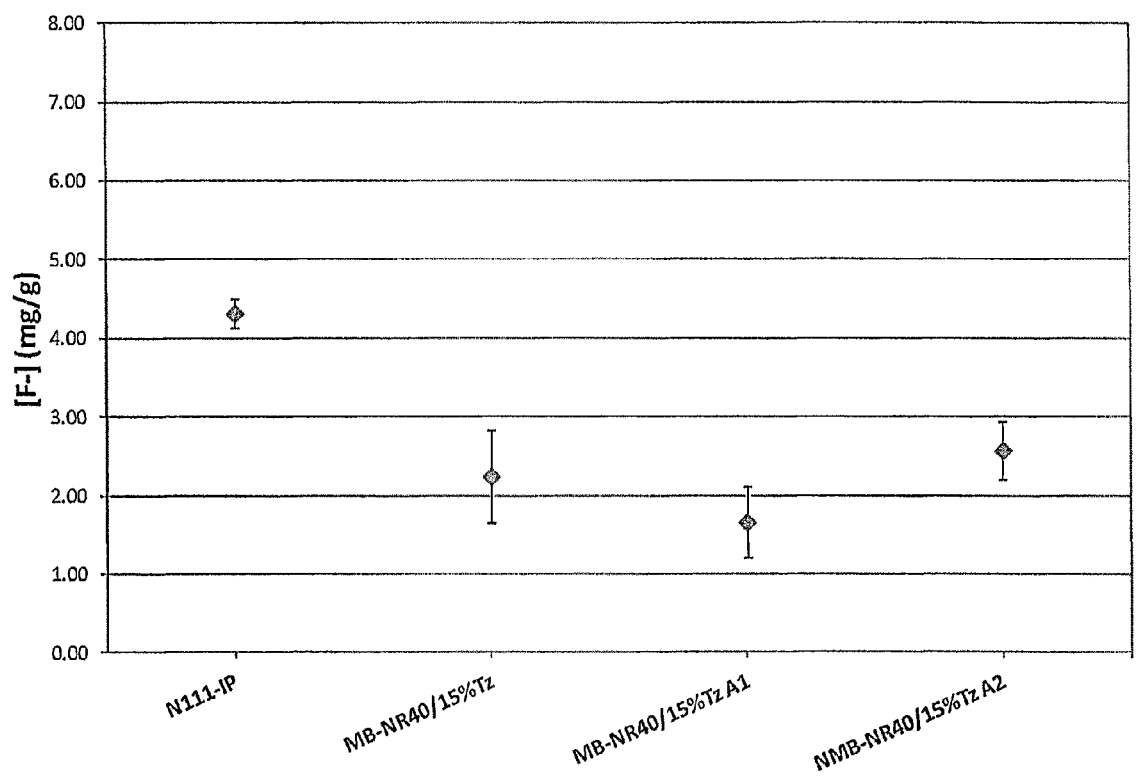
FIG. 8 provides fluoride release per gram of membranes for acid extruded Nafion™ NR40 with 15 wt % of 1,2,4-triazole additive as prepared (MB-NR40/15% Tz) and after activation with protocols A1 (MB-NR40/15% Tz A1) and A2 (MB-NR40/15% Tz A2) as well as N111-IP references.

Ex-situ Fenton's aging tests are not representative of in-situ fuel cell degradation as the presence of $Fe^{2+}$ catalyses hydroxyl radical generation at levels much higher than those present in an operating fuel cell. However, they can be used to compare chemical durability of materials to Fenton reagents. Membranes as extruded in the acid form with the process described in this patent, and after activation with protocols A1 and A2 were tested and compared to commercial extruded N111-IP. The results in FIG. 8 show milligrams of fluoride ions released per gram of membrane. In a comparative basis, these results suggest that the membranes of the present invention show a much higher stability to Fenton's aging tests, as the fluoride released in almost half of the N111-IP reference. These results demonstrate that an improvement in mechanical properties and dimensional stability translate to improved chemical stability.

REFERENCES

The contents of the entirety of each of which are incorporated by this reference.

Lai Y-H, et al. (2009) *Journal of Fuel Cell Science and Technology.* 6 (2), 1-13.
Mokrini A, et al. U.S. Provisional Patent Application Ser. No. 61/577,138 filed Dec. 19, 2011.
Sanchez J-Y, et al. (2009) United States Patent Publication US 2009-1315444 published May 21, 2009.
Sen U, et al. (2008) Anhydrous proton conducting membranes for PEM fuel cells based on Nafion™/Azole composites. *International Journal of Hydrogen Energy.* 33, 2808-2815.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

What is claimed is:

1. A process for producing an ion exchange membrane comprising: melt-processing a mixture of a perfluorosulfonic acid ionomer in its acid form and an additive comprising triazole, alkyl triazole, vinyl triazole, fluoro-alkyl triazole, fluoro-vinyl triazole, pyrazole, alkyl pyrazole, vinyl pyrazole, fluoro-alkyl pyrazole, fluoro-vinyl pyrazole, benzimidazole, alkyl benzimidazole, vinyl benzimidazole, fluoro-alkyl benzimidazole, fluoro-vinyl benzimidazole or any mixture thereof that is non-volatile, and thermally stable at a temperature of the melt-processing, to form a film having a thickness of from 3 to 200 microns.

2. The process according to claim 1, wherein the additive comprises 1,2,4-triazole, benzimidazole or a mixture thereof.

3. The process according to claim 1, wherein the additive comprises 1,2,4-triazole.

4. The process according to claim 1, further comprising removing the additive from the film after melt-processing.

5. The process according to claim 4, wherein the additive is removed by dissolving it in a solvent.

6. The process according to claim 5, wherein the solvent comprises water or an aqueous solution.

7. The process according to claim 5, wherein the aqueous solution is a solution of sulfuric acid.

8. The process according to claim 1, wherein the melt-processing comprises melt-extrusion, melt-casting or melt-blowing.

9. The process according to claim 1, wherein the additive is first dissolved in an aqueous solution before melt-processing with the perfluorosulfonic acid ionomer.

10. The process according to claim 1, wherein the perfluorosulfonic acid ionomer is pre-swollen before melt-processing with the additive.

11. A process according to claim 1, wherein the perfluorosulfonic acid ionomer is a perfluorosulfonic acid-polytetrafluoroethylene copolymer of Formula (II):

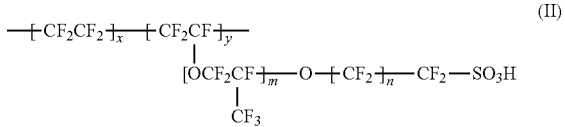

(II)

wherein the number of repeat units x and y are such that there are less than 15 x units for each y and the value of m and n are integers between 0 and 5.

12. An ion exchange membrane made by the process of claim 1.

13. The membrane according to claim 12, wherein the film has a thickness of from 3 to 95 microns.

14. The membrane according to claim 12, wherein the length and/or width changes by less than 7.5%.

15. The membrane according to claim 12, wherein the film consists of the perfluorosulfonic acid ionomer.

16. An electrochemical device comprising an electrolyte comprising the membrane as defined in claim 12.

17. The device according to claim 16 which is a polymer electrolyte membrane fuel cell.

18. The membrance according to claim 12, wherein the perfluorosulfonic acid ionomer is a perfluorosulfonic acid-polytetrafluoroethylene copolymer of Formula (II):

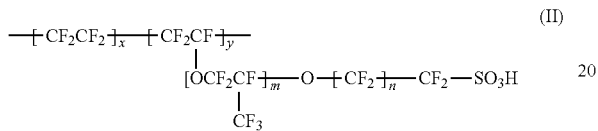

(II)

wherein the number of repeat units x and y are such that there are less than 15 x units for each y and the value of m and n are integers between 0 and 5.

* * * * *